(12) United States Patent
Poulad

(10) Patent No.: US 9,374,554 B1
(45) Date of Patent: Jun. 21, 2016

(54) DISPLAY SELECTION FOR VIDEO CONFERENCING

(71) Applicant: Rawles LLC, Wilmington, DE (US)

(72) Inventor: Navid Poulad, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 14/225,219

(22) Filed: Mar. 25, 2014

(51) Int. Cl.
*H04N 7/14* (2006.01)
*H04N 5/232* (2006.01)
*H04N 5/74* (2006.01)

(52) U.S. Cl.
CPC ............ *H04N 7/141* (2013.01); *H04N 5/23238* (2013.01); *H04N 5/74* (2013.01)

(58) Field of Classification Search
USPC .......................................... 348/14.01–14.09
See application file for complete search history.

(56) References Cited

U.S. PATENT DOCUMENTS

| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 8,539,560 | B2 * | 9/2013 | Angaluri ............... H04N 9/3194 715/781 |
| 2012/0081503 | A1 * | 4/2012 | Leow ..................... H04N 7/142 348/14.07 |
| 2012/0223885 | A1 | 9/2012 | Perez |
| 2013/0169746 | A1 * | 7/2013 | Iho ..................... H04N 5/23238 348/37 |
| 2014/0267545 | A1 * | 9/2014 | Paripally ............... H04N 7/142 348/14.02 |

FOREIGN PATENT DOCUMENTS

WO   WO2011088053 A2   7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Maria El-Zoobi
(74) *Attorney, Agent, or Firm* — Lee & Hayes, PLLC

(57) ABSTRACT

A video conferencing device has a projector that can be controlled to project far-end video onto different available display surfaces. A panoramic camera is mounted so that it captures a horizontal panorama that includes near-end users. When projecting far-end video, a display surface is selected based on the position of the users. Specifically, a display surface is selected such that when gazing at the far-end video the faces of the user are visible from the panoramic camera.

16 Claims, 5 Drawing Sheets

DISPLAY SELECTION FOR VIDEO CONFERENCING

BACKGROUND

Various devices may be used for video conferencing between participants in different locations. Suitable devices include dedicated video conferencing devices, smartphones, laptop computers, and other types of computing devices. Some devices used for video conferencing have integral display panels upon which far-end video is displayed. Other devices may project the far-end video on a screen or other suitable surface within an environment, or may use a separate video monitor located in a central location or on a suitable wall of a room.

Near-end video is often captured with a video camera located on the video conferencing device, at or near where the far-end video is displayed. This allows the illusion that participants at both ends of the conversation are looking directly at each other.

BRIEF DESCRIPTION OF THE DRAWINGS

In the accompanying figures, the left-most digit(s) of a reference number identifies the figure in which the reference number first appears. The use of the same reference numbers in different figures indicates similar or identical components or features.

DETAILED DESCRIPTION

Described herein are devices, systems, and techniques for displaying far-end video and capturing near-end video in a projection based device whose uses include video conferencing. Far-end video comprises video received from a remote location and displayed locally. Near-end video comprises video captured locally and provided to the remote location.

In certain embodiments, a video projector is mounted so that it can be controllably panned and tilted to project received far-end video onto a selectable one of multiple available display areas that are in different directions from the video projector. A panoramic camera is mounted relative to the projector so that it remains horizontal despite movement of the projector. During operation, the projector is panned and/or tilted under motorized control to project the far-end video on an available display area that is selected during operation based on the position of the user, such that when the user gazes toward at the display area he or she is also facing generally toward the panoramic camera. More specifically, when possible the display area is chosen so that the panoramic camera is between the user and the display area. A portion of the panoramic camera video containing the face of the user is then extracted and transmitted to the far-end conferencing equipment.

When there are two or more participants at the near end, an available display area may be selected to best accommodate the positions of the multiple participants, such that when gazing toward the displayed far-end video all participants are looking in a direction as close as possible to the direction of the camera. For example, if both participants are on one side of the camera, the far-end video may be projected on a surface that is on the other side of the camera. Alternatively, the far-end video may be projected on a surface across from the participant who is currently speaking or who most recently spoke, and the far-end video may switch from surface to surface as the different near-end participants speak.

Figure 1:
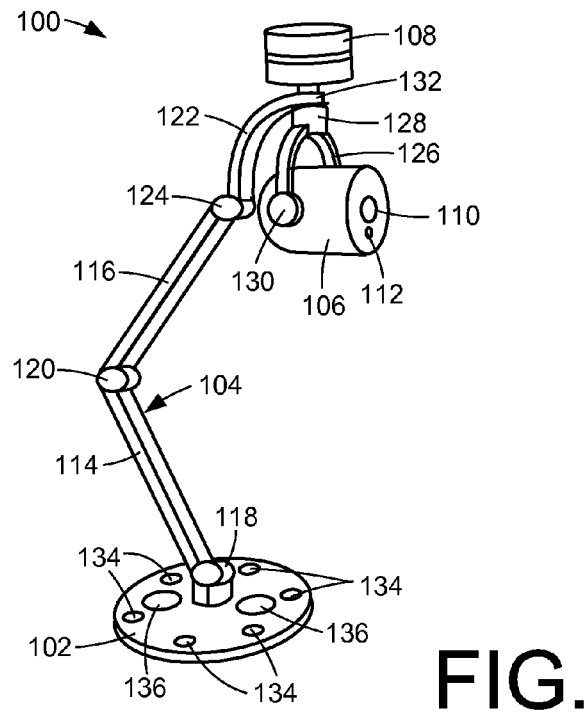
FIG. 1 is a perspective view of a device that may be used in accordance with techniques described herein for capturing and displaying video.

FIG. 1 shows an example of a projection based video conferencing system or device 100. The device 100 has a base 102 and an articulated arm 104 that supports a projector or projection head 106 and an omnidirectional or panoramic camera 108. The projection head 106 contains a video projector and/or projector lens 110. In some embodiments, the projection head 106 may also contain a camera 112 and/or other sensors. Other sensors may include microphones, depth cameras or sensors, color cameras, infrared cameras, proximity sensors, and so forth. The projection head 106 may also include different types of output devices, including lamps, indicators, illumination devices, speakers, annunciators, displays, and so forth. The projection head 106 may further contain control logic and/or components for implementing, controlling, and coordinating the logical functions and functionality of the device 100.

The articulated arm 104 comprises a lower support arm 114 and an upper support arm 116. The lower arm 114 is connected through a pivot joint 118 to the base 102. The upper arm 116 is connected through a pivot joint 120 to the lower support arm 114. A mounting arm 122 is connected through a pivot joint 124 to the top of the upper support arm 116. The pivot joints provide relative motion about horizontal axes so that the lower and upper support arms 114 and 116 can be extended upwardly or collapsed downwardly. The articulated arm 104 may be configured to maintain the relative positions of the support arms 114 and 116, and the height of the projection head 106, through friction or spring balancing.

The support arms 114 and 116 and pivot joints 118, 120, and 124 may utilize a parallel bar mechanism so that the mounting arm 122 maintains a constant horizontal attitude despite adjustments to the height of the mounting arm 122 and its supported components.

A gimbal 126 connects the projection head 106 to the mounting arm 122. An actuator 128 may be used at the base of the gimbal to provide controlled rotation of the projection head 106 about a vertical axis, which is referred to as panning. In the illustrated embodiment, the projection head 106 can be rotated approximately 180 degrees. Other configurations may allow 360 degree rotation of the projection head 106.

An actuator 130 may be used at the connection of the projection head to the gimbal 126 to provide controlled rotation of the projection head 106 about a horizontal axis, which is referred to as tilting. In this embodiment, the gimbal 126 is configured so that the projection head 106 hangs below an outer end 132 of the mounting arm 122.

In some cases, the articulated arm 104, the mounting arm 122, and other supported components may be rotatable as a unit relative to the base 102, about a vertical axis. In some cases, this rotational movement may also be motorized, although this is not shown in FIG. 1.

In the described embodiment, the panoramic camera 108 is supported by the mounting arm 122 above the projection head 106. The panoramic camera 108 may be fixed to the mounting arm 122 to capture panoramic images or video in directions corresponding to 360 degrees around an approximately vertical axis. Because of the parallel arm linkage employed by the support arms 114 and 116, the panoramic camera 108 maintains a fixed horizontal attitude regardless of any movement of the articulated arm 104, such as when the projection head 106 is raised or lowered. Similarly, the panoramic camera 108 maintains its constant horizontal attitude regardless of any motorized or actuated movement of the projection head 106.

Although FIG. 1 shows a particular mechanism for moving the projection head 106 about two distinct axes, other mechanisms and motion control mechanisms may be used in different embodiments to provide the projection head 106 with one, two, three, or more degrees of freedom. In certain embodiments, the projection head 106 may have three controllable degrees of freedom, corresponding to pitch, yaw, and roll, which may be controlled using means other than those described herein.

The panoramic camera 108 may be implemented in various ways to capture a 360 degree panorama. In some embodiments, the camera 108 may have multiple lenses and sensors pointing in different directions, and may capture individual images that are stitched together to form a 360 degree panorama. In other embodiments, the camera 108 may have a lens that directs a panoramic view to a single two-dimensional camera sensor.

Multiple microphones 134 may be positioned on or in the base 102. The microphones 134 may be used for capturing speech from users as well as for capturing other audio. The microphones 134 also enable audio beamforming and/or sound source localization. Microphones contained by the projection head 106 may also be used for beamforming and/or sound source localization.

The base 102 may also have one or more speakers 136, which may be used to play various types of audio, including far-end audio during video conferencing. Alternatively, various types of wireless communications may be implemented between the base and head of the device 100.

The various elements and components of the device 100 may be communicatively coupled through wiring, bussing, and so forth that extend through the support arms 114 and 116. Alternatively, various types of wireless communications may be implemented between the base and head of the device 100.

The described configuration of the device 100 allows it to project video and other images onto various surfaces within a room. The motorized configuration of the projection head 106 allows the device to quickly move projected images from one surface to another. In many situations, the device 100 may project images upon walls of a room. However, images may also be projected onto horizontal surfaces such as table tops. In addition, images may be projected onto a handheld display surface or object such as white sheet of paper or cardboard.

In some embodiments, the device 100 may have environmental analysis capabilities that allow it to determine positions of users within a room as well as the three-dimensional characteristics of the room and objects within the room. For example, the camera 112 housed by the projection head 106 may comprise or include a depth camera or depth sensor. Data from the depth sensor may be analyzed to detect the locations and orientations of planar surfaces and other surfaces within a room. In the case of a handheld projection surface, the device 100 may continuously analyze depth data to track the projection surface over time.

The camera 112 may also comprise or include a color camera, and both depth images and color images may be analyzed to detect particular objects and features visible from the projection head 106, including faces and hands. In some cases, the device 100 may be configured to accept commands in the form of hand gestures. The device 100 may also be configured to perform gaze or attention tracking by analyzing facial features such as eyes.

The microphones 134 of the device 100 may be analyzed to provide information about the environment within which the device 100 is placed. Audio captured by the microphones 134 may be analyzed, for example, to identify users who are speaking. Voice recognition may also be performed to detect and respond to spoken commands uttered by a user.

In some cases, beamforming may be used to focus audio reception on particular directions and to ignore sounds coming from other directions, based on multiple audio signals produced by the microphones 134. In one embodiment, different directional audio signals produced by beamforming techniques may be monitored for voice activity. Voice recognition may be applied to the any of the directional audio signals in which voice occurs.

Furthermore, positions of users may be inferred from voice activity detection performed with respect to individual directional audio signals. Specifically, directional audio signals corresponding to different directions may be analyzed to detect voice activity. When a particular directional audio signal contains voice, it can be inferred that there is a user located at the direction corresponding to the directional audio signal.

Other sound source localization techniques may also be used, based on the multiple audio signals produced by the microphones 134, to determine originating locations of sound sources and to infer positions of users within an environment of the device 100.

Generally, the device 100 may be used for various purposes, not limited to those described herein. The video capture and presentation techniques described below, similarly, may be used for various purposes that are not limited to video conferencing.

Figure 2:
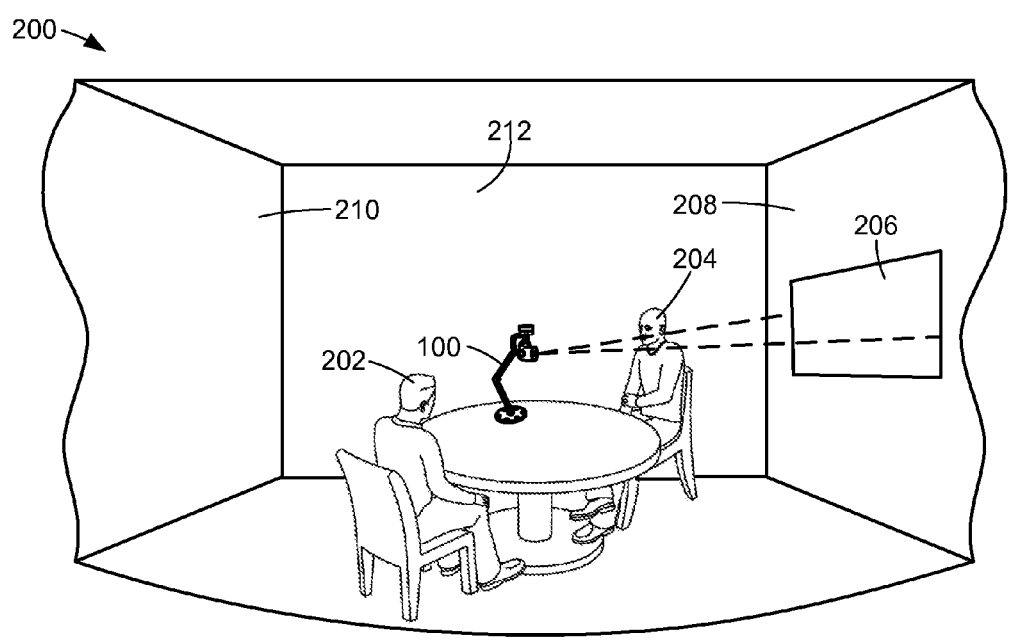
FIG. 2 is a figurative diagram illustrating an example usage of the device within a room.

FIG. 2 shows an environment 200 in which the device 100 may be used. FIG. 2 also illustrates an example of how the device 100 might operate. In the depicted example, the device 100 is being used for video conferencing between two sites or locations. The depicted location is referred to as the near end of the video conference. The remote site, which is not shown, is referred to as the far end. The device 100 is used to display far-end video received from the remote, far-end site, to capture near-end video that includes one or more of the users present in the near-end environment, and to transmit the captured near-end video to the far end.

In FIG. 2, the device 100 is placed on a table, approximately between first and second users 202 and 204. The device 100 has detected that the first user 202 is talking. In response, the device 100 has directed the projection of far-end video onto a projection area 206 that has been identified by the device 100 on a wall 208 across the device 100 from the first user 202. Because of the selected position of the projection area 206, the first user 202 is forced to look generally in the direction of the device 100 when looking at the projection area 206, thereby allowing the panoramic camera 108 of the device 100 to capture near-end video of the user's face.

If the second user 204 turns to look at the projection area 206, he or she will be facing away from the device 100. Accordingly, the device 100 may be configured to dynamically move the projection area 206 to the wall 210, which is across the device 100 from the second user 204 when the second user 204 is speaking. Alternatively, the device 100 may be configured to select the back wall 212 of the room for the projection area 206, so that both users will be forced to look generally in the direction of the device 100 when looking at the selected projection area. Generally, the device 100 is configured to analyze its environment, to detect suitable display surfaces, to determine locations of users, and to dynamically select the most appropriate projection area based on this information. Projection or display areas may include walls, table tops, handheld sheets, and other objects or surfaces.

Figure 3:
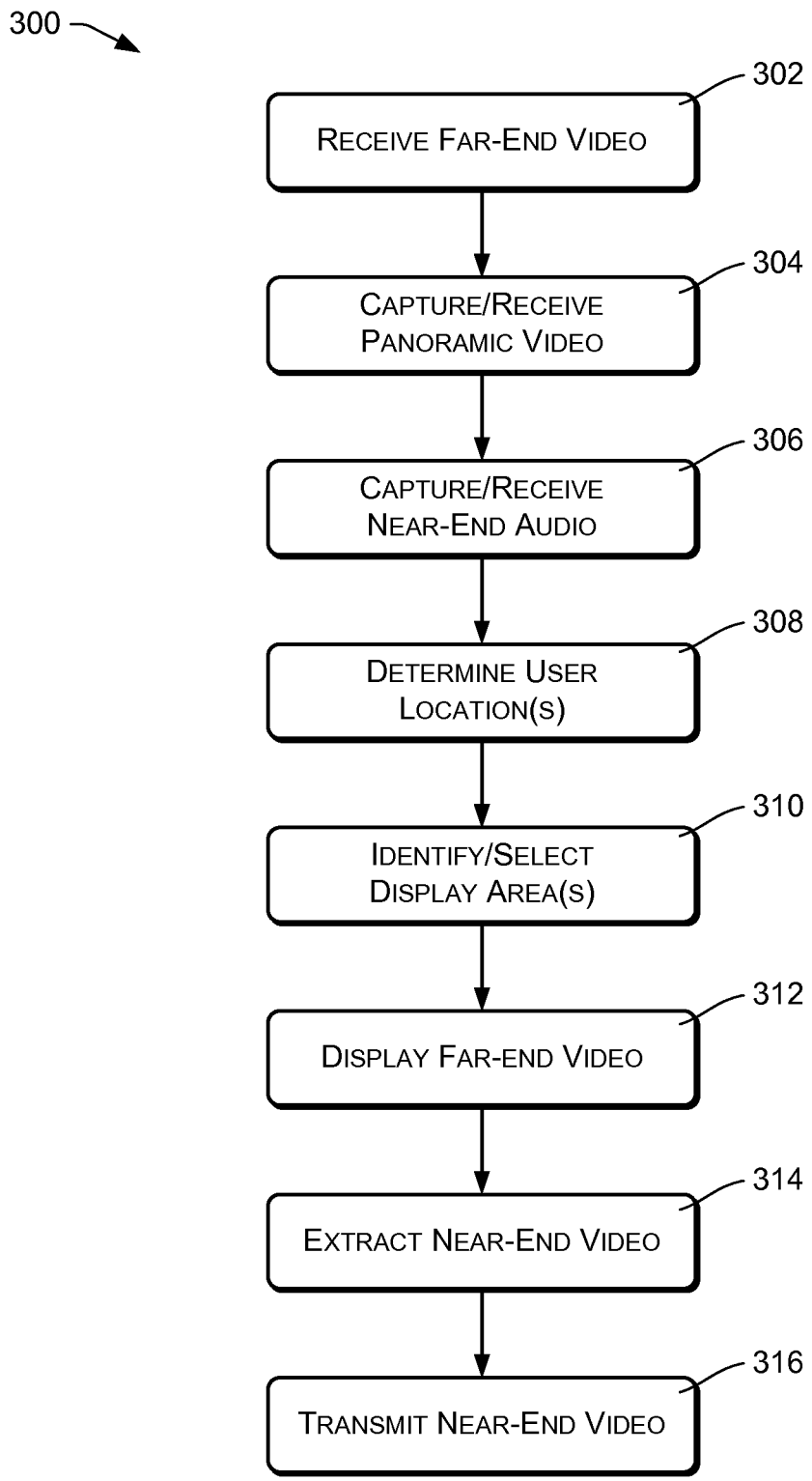
FIG. 3 is a flow diagram illustrating an example method of displaying far-end video and capturing near-end video in conjunction with the device shown by FIG. 1.

FIG. 3 illustrates an example process 300 that may be implemented by the device 100 when functioning as a video conferencing device. Although the process 300 is described in relation to the device 100 described above, the process 300 may also be implemented by and/or used with other devices and systems.

An action 302 comprises receiving far-end video from a video conferencing device or system at a remote site. The far-end video may include far-end audio. Communications with the remote site may be through various types of communications networks such as private networks, public networks, near-area networks, wide-area networks, telephone networks, the Internet, and so forth.

An action 304 comprises capturing and/or receiving panoramic video from the camera 108. In certain embodiments, the captured video may encompass a 360 degree horizontal panorama of an environment, which may include any number of users who may be present. Depending on the relative locations of the users and the currently selected projection area, the users may be gazing in the direction of the camera 108, and the panoramic image produced by the camera 108 may include the faces of the users or at least side views of the user faces.

An action 306 comprises capturing and/or receiving near-end audio. The near-end audio may be captured using the microphones 134 of the device 100. Beamforming may be used in some embodiments to selectively receive audio from particular directions, so as to more effectively recognize and interpret speech from individual users. Different directions may be selected as a function of which participant is currently speaking.

An action 308 comprises detecting locations of one or more users. In some embodiments, this may be performed by analyzing the panoramic video produced by the camera 108. Face detection techniques may be used, for example, to detect user faces in the panoramic video and to thereby determine the locations of the users. In this case, the locations comprise directions or angles relative to the vertical axis of the camera 108.

The action 308 may also be performed using beamforming and/or sound source localization techniques based on microphone signals received from the multiple microphones 134 of the device 100. For example, sound localization may be used to determine the direction from which speech originates, thereby identifying the location of a speaking user relative to the device 100. In some embodiments, beamforming may be used to determine rough angular coordinates of the user, indicating the direction of the user relative to the device 100. In other embodiments, sound source localization may be used to determine three-dimensional Cartesian coordinates of a user with a relatively higher degree of accuracy.

Various other techniques may be used in other embodiments to determine user locations. In some embodiments, for example, the device may be capable of capturing and analyzing three-dimensional properties of an environment and to detect users within the environment based on such three-dimensional properties. In some embodiments, the device 100 may have a depth sensor or depth camera that produces depth maps of the environment. The depth maps may be analyzed using shape detection algorithms to detect users and their locations. In some embodiments, user locations may comprise directions, both directions and distances, and/or two-dimensional or three-dimensional coordinates of users relative to the device 100.

An action 310 comprises identifying one or more display areas within an environment and selecting one of the display areas upon which to display the received far-end video. An action 312 comprises displaying or projecting the far-end video on the selected display area. The action 312 may be performed by controlling the pan and tilt of the projector 110 and directing the projected image onto the selected display area. In some cases, the projector may be configured to perform image corrections such as keystone correction, rotation, etc. in order to accommodate surfaces at various height and angles.

In some embodiments, the action 310 may be performed upon startup of the device 100 or upon initiating a video conference. For example, a three-dimensional image or depth map of the environment may be captured and analyzed to detect and/or identify planar surfaces within the environment. A white or uniform image may then be projected onto each of the planar surfaces and analyzed using captured color images to determine color uniformity and other reflective characteristics of the surfaces. Upon identifying planar surfaces that exhibit suitable reflective properties, the device 100 may store the locations of the surfaces so that they can be selected for subsequent display of video.

An action 314 comprises identifying one or more users in the captured panoramic video and extracting one or more portions of the panoramic video containing the users. The extracted portions of the panoramic image may be used as near-end video and transmitted to the far-end site in an action 316. The near-end video may also include the local audio captured in the action 306.

FIGS. 4-8 illustrate examples of the action 310 of identifying suitable display areas and selecting a display area based on the locations of one or more users within a room 402. The device 100 is shown as a shaded rectangle and users are shown as shaded circles.

Figure 4:
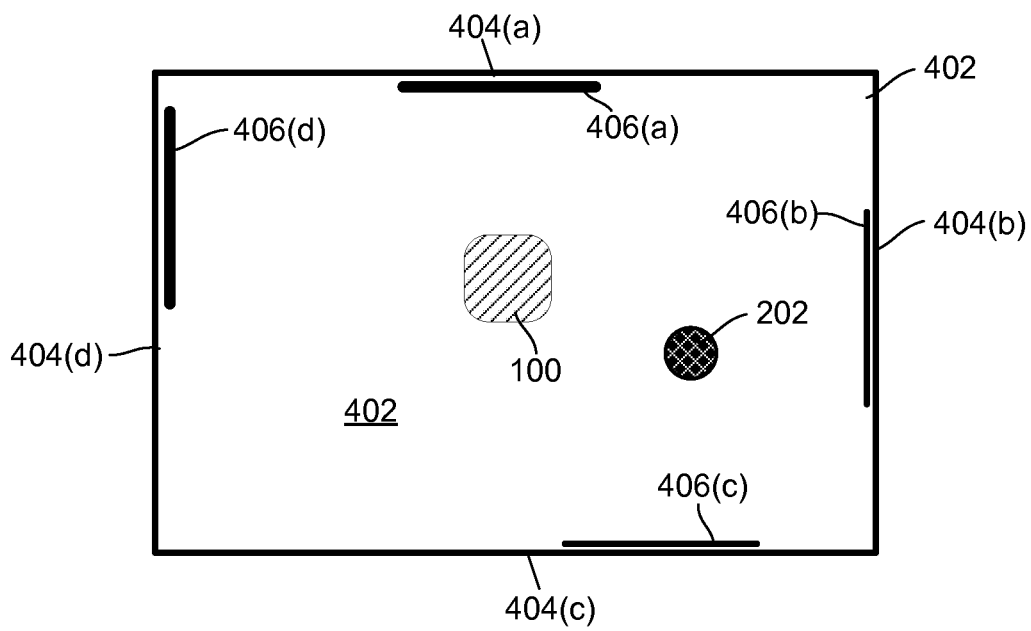
FIGS. 4-8 are block diagrams illustrating examples of selecting display areas in conjunction with the method shown in FIG. 3.

FIG. 4 illustrates a first example in which a single user 202 is present in the room 402. The room 402 in this example has four walls 404. In some cases, any of the walls 404 may be suitable surfaces upon which far-end video may be projected. In other cases, only certain of the walls or portions of the walls may be suitable. Generally, an optimum projection or display area is planar and has a uniform, non-patterned color, although less optimum surfaces may also be used. In the examples of FIGS. 4-8, the action 310 may include identifying suitable areas of the walls 404. In FIG. 4, four suitable display areas 406(*a*), 406(*b*), 406(*c*), and 406(*d*) have been identified, on portions of the walls 404(*a*), 404(*b*), 404(*c*), and 404(*d*) respectively.

Identifying a suitable projection surface or area may be performed by analyzing images of the room obtained by the device 100. For example, images produced by the panoramic camera 108 may be analyzed to detect suitable surfaces. Similarly, images obtained by the camera 112 of the projection head 106 may be analyzed to detect suitable surfaces. In some cases, the projection head 106 may scan the room 402 in order to obtain information regarding available surfaces. The identification of suitable display surfaces or areas may be based on two-dimensional color data, on three-dimensional depth information, and/or on different combinations of images containing both two-dimensional and three-dimensional information. In embodiments where the device 100 has three-dimensional analysis capabilities, three-dimensional images or depth maps may be analyzed to detect planar surfaces and the positions of the planar surfaces relative to the device 100. Other images, such as two-dimensional images, may then be analyzed to detect areas of the surfaces having uniform or non-patterned colors.

The action 310 includes selecting one of possibly several suitable display areas for projection of the far-end video. The display area is selected such that the face of the user 202 is visible from the panoramic camera 108 when the user 202 gazes toward the display area from his or her location in the room 402. Generally, the selected display area is across the device 100 from the location of the user, and the device 100 is between the user and the selected display area.

In the example of FIG. 4, only two of the suitable display areas, 406(a) and 404(d), satisfy the condition that the device 100 is between the user 202 and the display area. Accordingly, either one of the display areas 404(a) or 404(d) may be selected to receive the projection of the far-end video. When the user 202 gazes toward either of the display areas 406(a) or 406(d), he or she is also facing generally toward the device 100, and a generally frontal view of the user's face is presented to the device 100. If the user were to gaze toward either of the other display areas 406(b) or 406(c), he or she would be facing generally away from the device 100 and the front of the user's face would not be sufficiently visible from the device 100.

In some embodiments, the action 310 of selecting a display area may be performed by first determining a direction of the user 202 relative to the device 100 and/or camera 108. Directions of suitable display areas are also determined. An optimum display area might be selected as one whose direction is 180 degrees opposite the direction of the user 202. If such a display area is not available, the available display area whose direction is closest to 180 degrees opposite the direction of the user 202 may be selected.

Figure 5:
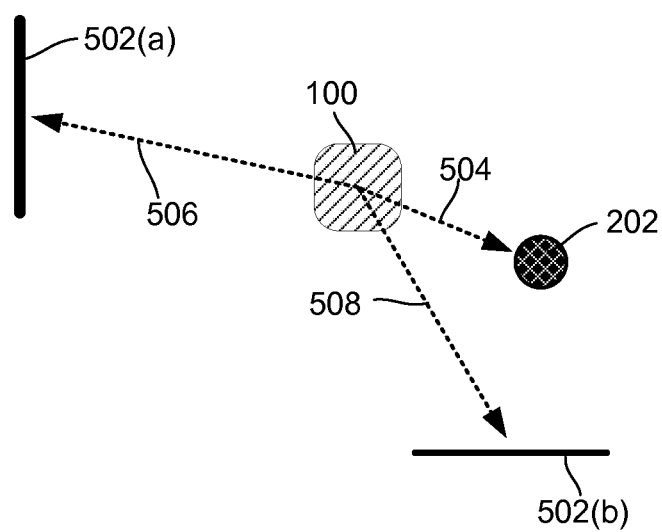

FIG. 5 illustrates an example of determining whether a particular display area satisfies the condition that the device 100 is between the device 100 and the user 202. In this example, two suitable display areas 502(a) and 502(b) have been identified. A direction 504 from the device 100 to the user 202 is determined. A direction 506 from the device 100 to the first display area 502(a) is determined. A direction 508 from the device 100 to the second display area 502(b) is determined. The device 100 is considered to be between the user and a particular display area if the difference between the direction of the display area from the device 100 and the direction of the user 202 from the device 100 is greater than a predefined threshold. As examples, the threshold may be set at 45 degrees, 90 degrees, 135 degrees, etc. In an ideal situation the difference would be 180 degrees, with the selected display area directly across the device 100 from the user 202.

For purposes of discussion, assume that the threshold is 90 degrees. The display area 502(a) satisfies this criteria because its direction 506 is greater than 90 degrees different than the direction 504 to the user 202. The display area 502(b) does not satisfy the criteria because its direction 508 is not different from the direction 504 to the user 202 by more than 90 degrees.

Figure 6:
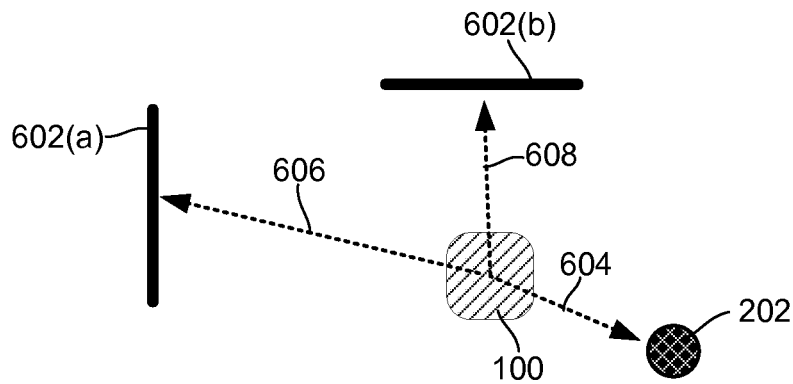

FIG. 6 illustrates an example of selecting from multiple suitable display areas 602(a) and 602(b), each of which satisfies the criteria that the device 100 is located between the display area and the user 202. A direction 604 from the device 100 to the user 202 is determined. A direction 606 from the device 100 to the first display area 602(a) is determined. A direction 508 from the device 100 to the second display area 502(b) is determined. The display area whose direction from the device 100 is closest to 180 degrees different than the direction of the user 202 is selected to receive the far-end video. In this example, the direction 606 of the first display area 602(a) is closest to 180 degrees from the direction 604 of the user 202 from the device 100. Accordingly, the first display area 602(a) is selected as for projection of the far-end video.

Figure 7:
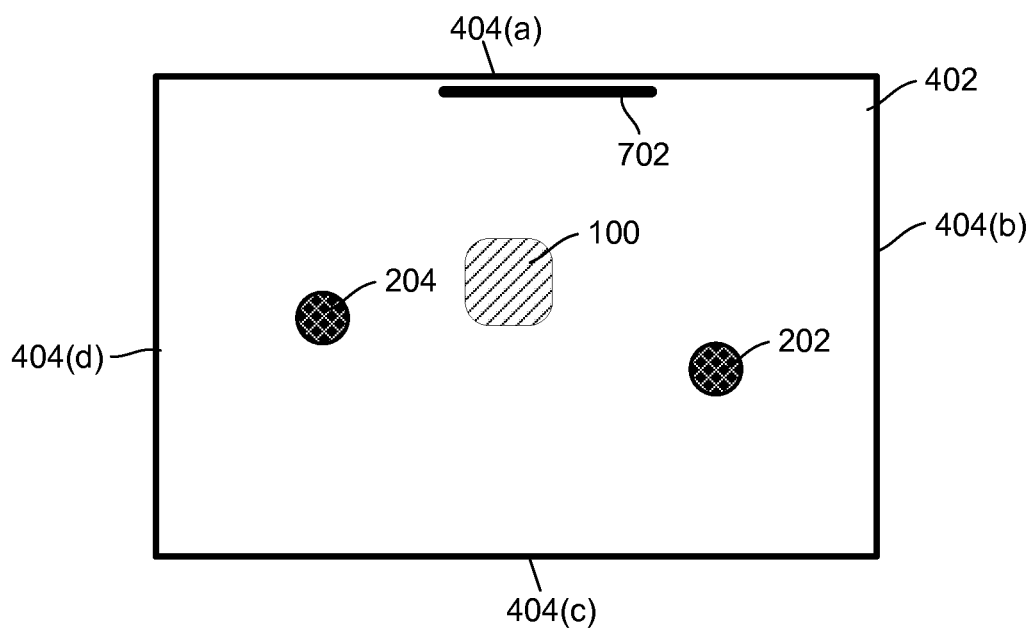

FIG. 7 illustrates an example in which the first user 202 and the second user 204 are present in the room 402. In this embodiment, the device 100 may be configured to select a single display area 702 upon which to project the far-end video, based on the positions of both of the users 202 and 204 relative to the device 100. Specifically, the display area 702 may be selected such that the faces of both the first user 202 and the second user 204 are visible from the panoramic camera 108 when the users 202 and 204 gaze toward the display area 702 from their respective locations in the room 402. In this case, it may be that neither of the users are looking directly in the direction of the device 100 when they gaze at the display area 702, but their faces may still be visible to the camera 108 of the device 100.

The display area 702 may in certain embodiments be selected by first determining directions of the users 202 and 204 relative to the device 100 and/or camera 108. Directions of suitable display areas are also determined. An optimum display area is selected as one whose direction is 180 degrees opposite the averaged directions of the users 202 and 204 from the device 100. If such a display area is not available, the display area whose direction is closest to 180 degrees opposite the averaged directions of the users 202 and 204 may be selected.

Figure 8:
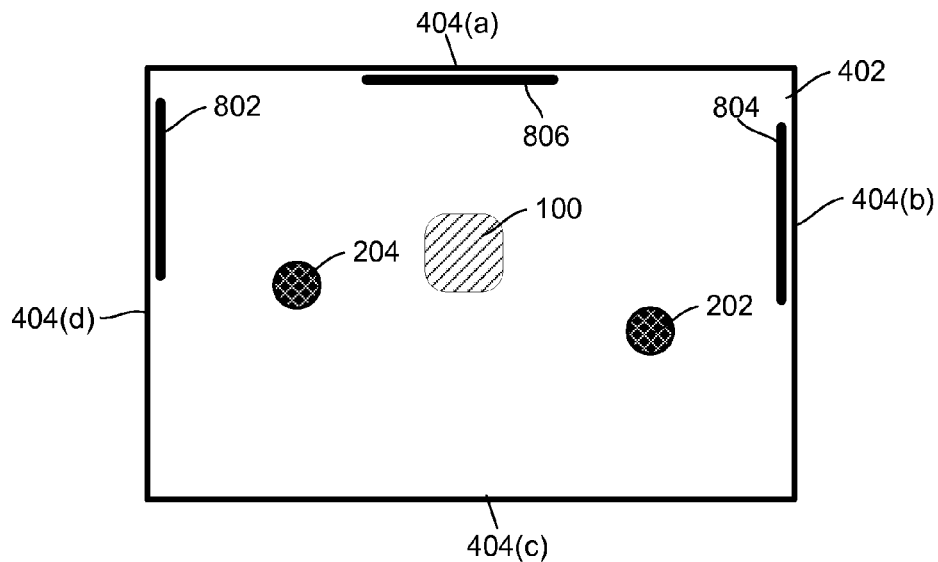

FIG. 8 illustrates an example in which the first user 202 and the second user 204 are present in the room 402, at the same locations as shown in FIG. 7. In this embodiment, the device 100 may be configured to select alternate display areas 802 and 804, and to project the far-end video onto either one or the other of the display areas 802 and 804 depending on which of the users 202 or 204 is currently speaking. For example, the far-end video may be projected onto the first display area 802 when the first user 202 is speaking, while the far-end video may be projected onto the second display area 804 when the second user 204 is speaking. In addition, an intermediate display area 806 may be used when neither of the users 202 or 204 are speaking, and/or when a user at the remote site is speaking.

The first and second display areas 802 and 804 can be selected as described above with reference to FIGS. 4-6, such that the first display area 802 is generally across the camera 108 from the first user 202 and the second display area 804 is generally across the camera 108 from the second user 204. The third display area 806 can be selected as described above with reference to FIG. 7, so that it is generally across the camera 108 from both of the users 202 and 204, or so that it is as close as possible to 180 degrees opposite the averaged directions of the users 202 and 204. Stated alternatively, the third display area is selected such that that the camera 108 is (a) between the face of the first user 202 and the display area and (b) between the face of the second user 204 and the display area.

Figure 9:
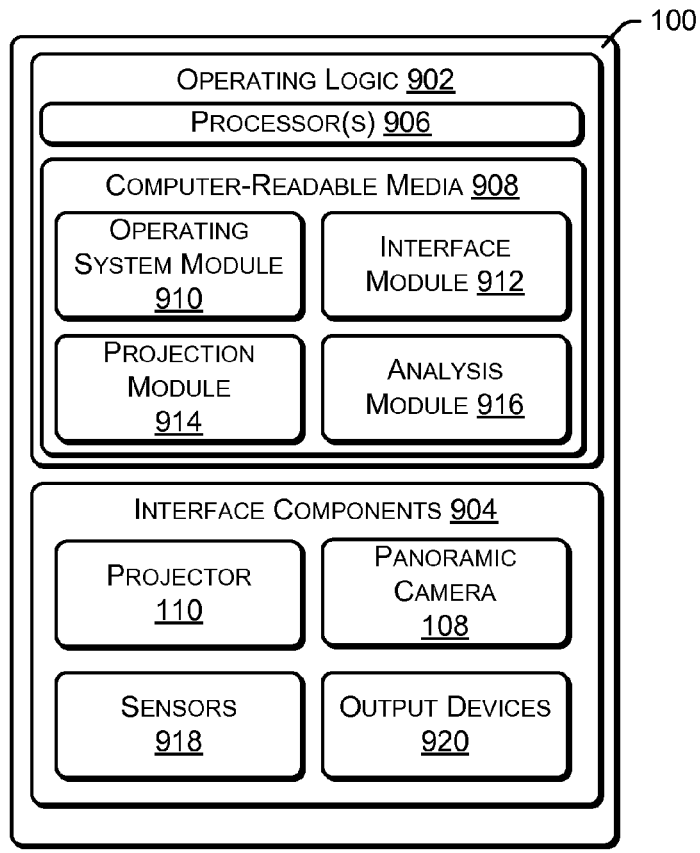
FIG. 9 is a block diagram illustrating example functional components and logical elements of the device shown in FIG. 1.

FIG. 9 illustrates relevant components in an example implementation of the device 100. The device 100 may include operating logic 902 that is configured to perform the actions described above with reference to FIG. 3. The device 100 may also include interface components 904 for obtaining information about the environment of the device 100 and for producing sound and video. The operating logic 902 and interface components 904 may be configured in conjunction with each other to implement the techniques described above.

The operating logic 902 of the device 100 may include one or more processors 906 and computer-readable media 908. The processor(s) 906 may be configured to execute instructions, which may be stored in the computer-readable media 908 or in other computer-readable media accessible to the processor(s) 906. The processor(s) 906 may include digital signal processors (DSPs).

The computer-readable media 708 may include non-transitory computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the device 100. The computer-readable media 908 may reside within the projection head 106 of the device 100, on one or more storage devices accessible on a local network, on cloud storage accessible via a wide area network, or in any other accessible location.

The computer-readable media 908 may store executable components, programs, routines, modules, etc., such as instructions, datastores, and so forth that are configured to execute on the processors 906. For instance, the computer-readable media 908 may store an operating system module 910 and an interface module 912.

The operating system module 910 may be configured to manage hardware and services within and coupled to the device 100 for the benefit of other modules. The interface module 912 may be configured to receive and interpret commands from users and to respond to such commands in various ways. For instance, the interface module 912 may analyze various input captured by components of the device 100 to identify user hand gestures or voice commands. In response to identifying a gesture or voice command, the interface module 912 may cause the device 100 to perform a corresponding action. For instance, if a user makes a gesture requesting that the device 100 project a certain piece of content, the interface module 912 may interpret the gesture and cause the device 100 project the content.

The computer-readable media 908 may also include a projection module 914 that controls projection of far-end video and other visual content. The projection module 914 may be configured to control the movement of the projection head 106 to project far-end video and other content onto selected display areas.

The computer-readable media 908 may also include an analysis module 916 configured to analyze various available sensor data in order to identify locations of suitable projection surfaces, to determine locations of users, and to select display areas as described above.

These various modules implemented by the operating logic 902, as well as other modules not shown, may be configured collectively to perform the techniques described above.

The interface components 904 may include various components already described, such as the projector 110 and the panoramic camera 108. The interface components 904 may also include various other sensors 918, such as microphones, various types of cameras and imaging devices, and so forth. In some cases, the sensors 918 may include user input mechanisms such as keyboards, keypads, cursor movement devices such as mice, touch-sensitive screens, and so forth.

The interface components may also include various other output devices 920 such as speakers, different types of projectors, lights, lamps, annunciators, indicators, displays, and so forth, including components for conveying information to users.

Although certain embodiments have been described above in the context of video conferencing, the concepts described herein may also be used in other environments and for other purposes. Architectures other than those described above may be used to implement the described functionality, and are intended to be within the scope of this disclosure. Although specific distributions of responsibilities are defined above for purposes of discussion, the various functions and responsibilities might be distributed and divided in different ways, depending on particular circumstances. For example, components and logical functionality described above as being integrated within a single device may instead be distributed among multiple devices.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A video conferencing system, comprising:
   a video projector that is controllable to project far-end video;
   a video camera configured to capture, as captured video, video encompassing a 360 degree horizontal panorama;
   wherein the video projector is controllable to pan and tilt independently of the video camera; and
   operating logic configured to perform actions comprising:
   determining a first display area suitable to receive the far-end video projected by the video projector;
   determining a second display area suitable to receive the far-end video projected by the video projector;
   analyzing the captured video to determine a first location of a first user;
   selecting the first display area such that the video camera is between the first location and the first display area;
   controlling the video projector to project the far-end video onto the first display area based at least in part on determining that the first user is speaking;
   analyzing the captured video to determine a second location of a second user;
   selecting the second display area such that the video camera is between the second location and the second display area;
   determining that the second user is speaking;
   controlling the video projector to project the far-end video onto the second display area; and
   extracting a portion of the captured video that contains a face of the first user to produce near-end video.

2. The video conferencing system of claim 1, wherein analyzing the captured video to determine the first display area and the second display area is performed upon initiating a video conference.

3. The video conferencing system of claim 1, the actions further comprising
   selecting a display area such that the video camera is between the second location and the first display area.

4. A device, comprising:
a projector positioned within a first environment;
a camera; and
logic configured to perform actions comprising:
- receiving an image from the camera, the image associated with the first environment;
- determining, based at least in part on the image, a first display area suitable to receive content projected by the projector;
- determining, based at least in part on the image, a second display area suitable to receive the content projected by the projector;
- selecting the first display area such that the camera is between a first user and the first display area;
- controlling the projector to project the content onto the first display area, the content associated with a second environment remote from the first environment;
- selecting the second display area such that the camera is between a second user and the second display area; and
- controlling the projector to project the content onto the second display area.

5. The device of claim 4, wherein the camera is configured to capture video encompassing a 360 degree horizontal panorama.

6. The device of claim 4, wherein the projector is configured to pan about a vertical axis.

7. The device of claim 4, wherein:
the projector is configured to pan about vertical and horizontal axes; and
the camera is configured to maintain a constant horizontal attitude.

8. The device of claim 4, the actions further comprising:
receiving the content from a remote site; and
transmitting the image to the remote site.

9. The device of claim 4, the actions further comprising determining a direction of a gaze associated with the first user and wherein the first display area is visible to the first user.

10. The device of claim 4, wherein the image includes the second user.

11. The device of claim 4, the actions further comprising detecting the second user within the first environment.

12. A method, comprising:
- detecting a first location of a first user relative to a camera;
- determining a first area suitable to display content;
- determining a second area suitable to display the content;
- selecting the first area based at least in part on the first location of the first user, wherein the first area is selected such that the camera is between the first area and the first location;
- displaying the content at the first area;
- capturing an image of the first user with the camera;
- detecting a second location of a second user relative to the camera;
- selecting the second area based at least in part on the second location of the second user, wherein the second area is selected such that the camera is between the second area and the second location; and
- alternatively displaying the content at the first area and the second area.

13. The method of claim 12, wherein detecting the first location comprises:
- capturing a panoramic image with the camera, wherein the panoramic image encompasses 360 degrees;
- detecting a position of a face of the first user in the panoramic image relative to the 360 degrees encompassed by the panoramic image; and
- determining a direction of the face of the first user relative to the camera based on the position of the face of the first user in the panoramic image relative to the 360 degrees encompassed by the panoramic image.

14. The method of claim 12, further comprising:
receiving the content from a remote site; and
transmitting the image to the remote site.

15. The method of claim 12, wherein the first location comprises at least a direction relative to the camera.

16. The method of claim 12, further comprising:
selecting the first area such that the camera is between the first area and the second location; and
capturing an additional image of the second user with the camera.

* * * * *